(12) United States Patent
Xiong et al.

(10) Patent No.: US 12,240,094 B2
(45) Date of Patent: Mar. 4, 2025

(54) MULTI-FUNCTION HANDHELD ELECTRIC TOOL

(71) Applicant: TECHTRONIC CORDLESS GP, Anderson, SC (US)

(72) Inventors: Guo Hui Xiong, Dongguan (CN); Wei Bing Wang, Dongguan (CN)

(73) Assignee: Techtronic Cordless GP, Anderson, SC (US)

( * ) Notice: Subject to any disclaimer, the term of this patent is extended or adjusted under 35 U.S.C. 154(b) by 0 days.

(21) Appl. No.: 18/606,553

(22) Filed: Mar. 15, 2024

(65) Prior Publication Data

US 2024/0217083 A1   Jul. 4, 2024

Related U.S. Application Data (63) Continuation of application No. 17/620,399, filed as application No. PCT/CN2020/117508 on Sep. 24, 2020, now Pat. No. 11,964,376.

(51) Int. Cl.
*B25F 5/00*   (2006.01)
*B23B 45/02*   (2006.01)
(Continued)

(52) U.S. Cl.
CPC .............. *B25F 5/001* (2013.01); *B23B 45/02* (2013.01); *B25F 3/00* (2013.01); *B25B 23/147* (2013.01); *B25D 16/003* (2013.01)

(58) Field of Classification Search
CPC .................................................. B25D 16/003
See application file for complete search history.

(56) References Cited

U.S. PATENT DOCUMENTS 3,736,992 A   6/1973   Zander et al.
5,451,127 A   9/1995   Chung
(Continued)

FOREIGN PATENT DOCUMENTS

CH   526374 A   8/1972
CN   201239943 Y   5/2009
(Continued)

OTHER PUBLICATIONS

Extended European Search Report for Application No. 20954517.7 dated Jul. 17, 2024 (8 pages).
(Continued)

*Primary Examiner* — Daniel Jeremy Leeds
(74) *Attorney, Agent, or Firm* — Michael Best & Friedrich LLP (57) ABSTRACT

A tool including a motor, a transmission including a ring gear including a face having a linear portion and ramps extending a fixed axial distance, a spindle, a setting collar, and a clutch coupled to the transmission. The collar is rotatable between predetermined angular positions including a first position corresponding to a non-torque-limited first operation mode and a plurality of second positions corresponding to different torque output settings of a torque-limited second operation mode. The clutch includes a follower positioned between a clutch washer and the face, and a clutch sleeve coupled to the collar that is movable a variable axial distance from the clutch washer dependent on the collar position. In the first angular position corresponding to the first mode, the fixed axial distance is greater than the variable axial distance, and in the second angular positions, the variable axial distance is greater than the fixed axial distance.

20 Claims, 5 Drawing Sheets

(51) Int. Cl.
B25B 23/147 (2006.01)
B25D 16/00 (2006.01)
B25F 3/00 (2006.01)

(56) References Cited

U.S. PATENT DOCUMENTS

| | | |
|---|---|---|
| 6,688,406 B1 | 2/2004 | Wu et al. |
| 6,892,827 B2 | 5/2005 | Toyama et al. |
| 6,926,095 B2 | 8/2005 | Chen |
| 7,775,294 B2 | 8/2010 | Ren et al. |
| 8,322,457 B2 | 12/2012 | Mok et al. |
| 8,939,228 B2 | 1/2015 | Kondo |
| 9,205,547 B2 | 12/2015 | Hirabayashi et al. |
| 9,849,574 B2 | 12/2017 | Hecht et al. |
| 9,878,434 B2 | 1/2018 | Hecht et al. |
| 9,908,228 B2 | 3/2018 | Elger |
| 2006/0201688 A1 | 9/2006 | Jenner et al. |
| 2006/0213675 A1 | 9/2006 | Whitmire et al. |
| 2007/0068693 A1 | 3/2007 | Whitmire et al. |
| 2007/0084614 A1 | 4/2007 | Whitmire et al. |
| 2009/0194305 A1 | 8/2009 | Xu et al. |
| 2009/0277658 A1 | 11/2009 | Chen |
| 2010/0193206 A1 | 8/2010 | Teng |
| 2010/0200257 A1 | 8/2010 | Scrimshaw et al. |
| 2011/0127059 A1 | 6/2011 | Limberg et al. |
| 2012/0018181 A1 | 1/2012 | Chen |
| 2012/0255755 A1 | 10/2012 | Kondo |
| 2014/0338940 A1 | 11/2014 | Kelleher et al. |
| 2017/0157753 A1 | 6/2017 | Nagasaka |
| 2018/0141200 A1 | 5/2018 | Elger |

FOREIGN PATENT DOCUMENTS

| | | |
|---|---|---|
| CN | 104669215 A | 6/2015 |
| CN | 204621991 U | 9/2015 |
| CN | 205057971 U | 3/2016 |
| DE | 2630319 C2 | 5/1985 |
| EP | 0612589 B1 | 5/1997 |
| EP | 2394797 A2 | 12/2011 |
| GB | 248231 A | 3/1926 |
| GB | 1414377 A | 11/1975 |
| GB | 2334911 B | 9/2000 |
| WO | 2012134472 A1 | 10/2012 |

OTHER PUBLICATIONS

RIDGID, R841150 assembly diagram, Rev. 06, dated Jan. 10, 2008 (1 page).
RIDGID, "1/2 in. 18 Volt Hammer Drill Two Speed / Reversible R841150," Operator's Manual, dated Jan. 2005 (22 pages).
Ryobi, "Ryobi 1/2 in. (13mm) 18 Volt Three Speed Cordless Hammer Drill Model No. HD1830," Repair Sheet, Rev. 04, dated Apr. 5, 2013 (3 pages).
Ryobi, "Ryobi 1/2 in. (13mm) 18 Volt Three Speed Cordless Hammer Drill Model No. P220," Repair Sheet, Rev. 02, dated Mar. 26, 2013 (4 pages).
Ryobi, "Ryobi 1/2 in., 18 Volt 3-Speed Hammer Drill P220," Operator's Manual, Rev. 02, dated Jul. 24, 2006 (20 pages).
Ryobi, "Ryobi 1/2 in., 18 Volt 2-Speed Hammer Drill P210," Operator's Manual, Rev. 01, dated Jul. 24, 2006 (20 pages).
Ryobi, "Ryobi 1/2 in. (13mm) 18 Volt Two Speed Hammer Drill Model No. P210," Repair Sheet, Rev. 04, dated Dec. 6, 2011 (4 pages).
Ryobi, "1/2 in. (13 mm) Three Speed Cordless Hammer Drill Model No. HD1830," Operator's Manual, dated Apr. 2004 (20 pages).
Ryobi, "1/2 in. (13 mm) Three Speed Cordless Hammer Drill Model No. HP1830M," Operator's Manual, dated Jun. 2003 (20 pages).
International Search Report and Written Opinion for Application No. PCT/CN2020/117508 dated Jun. 23, 2021 (10 pages).

MULTI-FUNCTION HANDHELD ELECTRIC TOOL

CROSS-REFERENCE TO RELATED APPLICATIONS

This application is a continuation of U.S. patent application Ser. No. 17/620,399, filed on Dec. 17, 2021, which is a national phase filing under 35 U.S.C. § 371 of International Application No. PCT/CN2020/117508, filed on Sep. 24, 2020, the entire contents of each of which are incorporated by reference herein.

BACKGROUND

The present invention relates to multi-function handheld electric tools, and more particularly to multi-function handheld electric tools having two or more, preferably three, modes of operation.

In a multi-function handheld electric tool having two or more modes of operation a user must manually select the appropriate mode of operation for the task at hand and the tool-bit engaged with the tool. Some tools have two separate mode selection means where one mode selector, say a linear switch, changes between hammer and non-hammer functions of the tool, and a second mode selector, say a rotary collar, selects between torque limited and non-torque limited outputs of the tool. It is preferable that a multi-function handheld tool has a single mode selector switch that not only facilitates the selection between two or more operating modes quickly and easily, but which also provides that only one mode of operation can be selected at any one time.

SUMMARY

The present disclosure provides, in one aspect, a power tool including a motor configured to provide a torque output, a transmission configured to receive the torque output from the motor, a spindle receiving a torque output from the transmission, a setting collar, and a clutch coupled to the transmission. The transmission includes a ring gear including a face having a plurality of ramps extending a fixed axial distance from a linear portion of the face. The setting collar is rotatable between a plurality of predetermined angular positions that include a first angular position corresponding to a non-torque-limited first operation mode of the power tool and a plurality of second predetermined angular positions corresponding to different torque output levels of a torque-limited second operation mode of the power tool. The clutch includes a clutch washer, a follower positioned between the face and the clutch washer, and a clutch sleeve coupled to the setting collar. The clutch sleeve is movable a variable axial distance from the clutch washer dependent on a respective one of the plurality of predetermined angular positions of the setting collar. In the first predetermined angular position of the setting collar that corresponds to the non-torque-limited first operation mode of the power tool, the fixed axial distance is greater than the variable axial distance and in the second predetermined angular positions of the setting collar, the variable axial distance is greater than the fixed axial distance.

The present disclosure provides, in another aspect, a power tool including a motor configured to provide a torque output to a spindle through a transmission, a setting collar, and a clutch coupled to the transmission. The transmission includes a ring gear including a face having a ramp extending a fixed axial distance from a linear portion of the face. The setting collar is rotatable between a plurality of predetermined angular positions that include a first predetermined angular position corresponding to a non-torque-limited first operation mode of the power tool and a plurality of second predetermined angular positions corresponding to different torque output levels of a torque-limited second operation mode of the power tool. The clutch includes a clutch washer, a follower positioned between the clutch washer and the face, and a clutch sleeve coupled to the setting collar. The clutch sleeve is movable a variable axial distance from the clutch washer dependent on a respective one of the plurality of predetermined angular positions of the setting collar, and in the first predetermined angular position of the setting collar that corresponds to the non-torque-limited first operation mode of the power tool, the fixed axial distance is greater than the variable axial distance, and in the second predetermined angular positions of the setting collar, the variable axial distance is greater than the fixed axial distance.

The present disclosure provides, in another aspect, a power tool including a motor configured to provide a torque output, a transmission configured to receive the torque output from the motor, a spindle receiving a torque output from the transmission, a setting collar, and a clutch. The transmission includes a ring gear including a face having a plurality of ramps extending a fixed axial distance form a linear portion of the face. The setting collar is rotatable between a plurality of predetermined angular positions that include a first predetermined angular position corresponding to a first operation mode of the power tool and a second predetermined angular position corresponding to second operation mode of the power tool. The clutch includes a clutch washer, a follower positioned between the face and the clutch washer, and a clutch sleeve coupled to the setting collar. The clutch sleeve is movable a variable axial distance from the clutch washer dependent on a respective one of the plurality of predetermined angular positions of the setting collar and in the first predetermined angular position of the setting collar that corresponds to the first operation mode of the power tool, the fixed axial distance is greater than the variable axial distance, and the in the second predetermined angular position of the setting collar, the variable axial distance is greater than the fixed axial distance.

Further aspects of the disclosure will become apparent from the following description and appended drawings which are given by way of example only to illustrate the invention.

BRIEF DESCRIPTION OF THE DRAWINGS

Embodiments of the present invention will now be described, by way of example only, with reference to the accompanying drawings.

DETAILED DESCRIPTION

The description of the invention set-forth below is intended to be illustrative only using language more or less specific to structural or methodical features of a handheld electrical tool. It is to be understood that the invention is not limited to specific features shown or described since the means herein described comprise preferred forms of putting the invention into effect. Variations and modifications of the forms disclosed herein may be made based on the description without departing from the scope of the invention as set forth in any one of the claims. Further, it will be clearly understood that, if a prior art publication is referred to herein, this reference does not constitute an admission that the publication forms part of the common general knowledge.

Figure 1:
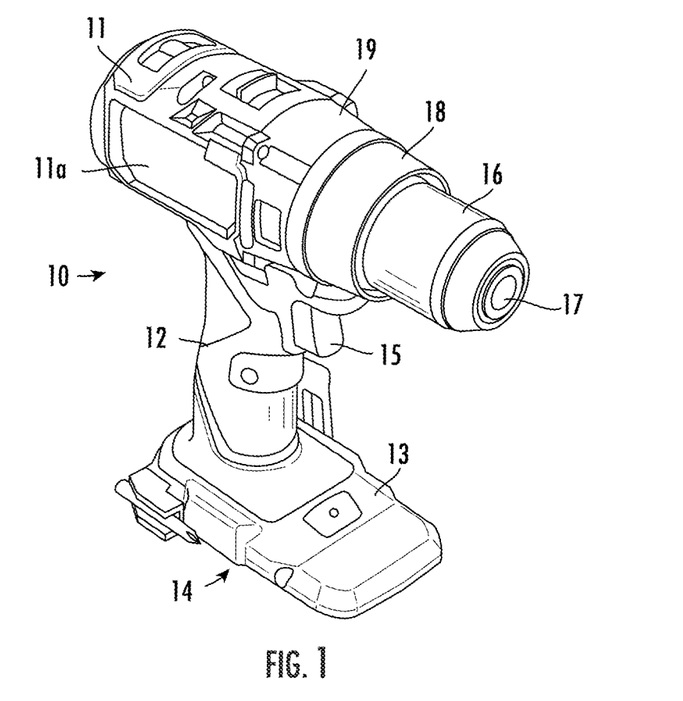
FIG. 1 is a perspective view of a power tool.

Referring to FIG. 1, generally, there is shown a multi-function handheld electrical tool 10 having a pistol-like shape with a handle 12 to be held by hands of an operator and a motor housing 11 extending from a top end of the handle 12 to define therein an interior space for accommodating a motor 11a for generating and transmitting torque from a motor shaft 28. A transmission/gear housing 19 is located at the front of the motor housing and partially encloses a portion of a planetary transmission 25 and a clutch 30. The transmission/gear housing 19 has a forwardly extending cylindrical extension portion 21 that partially encloses a portion of a hammer mechanism 40 of the tool. A clutch/mode selection collar 18 is rotatably located about the gear housing extension portion 21 and is operable by a user to select between modes of operation of the multi-function handheld electrical tool 10. A chuck 16 is rotatably mounted to a spindle 20 at a front end of the tool 10, adjacent the collar 18, and has a tool-bit receiving aperture 17 for accommodating an interchangeable tool-bit. Torque is transmitted from the motor shaft 28 to the chuck 16 via the transmission 25, clutch 30 and spindle 20. A power switch 15 is disposed on the handle 12 and is accessible by an operator to turn on and off the motor 11a. The motor 11a may be powered by a battery accommodated with a battery receptacle 14 located at the lower distal end 13 of the handle 12. When an operator depresses the power switch 15, power is delivered from the battery to the motor 11a to generate a torque at motor shaft 28. The output torque is transferred along an output axis of the tool between the motor shaft 28 and the chuck 16 via the transmission 25, clutch 30 and tool spindle 20. The single clutch/mode setting collar 18 is rotatable by a user to select between one of a plurality of torque limited or non-torque limited functions such a "screwdriver mode" or a "drill-only mode" or a "hammer drill mode".

Figure 2:
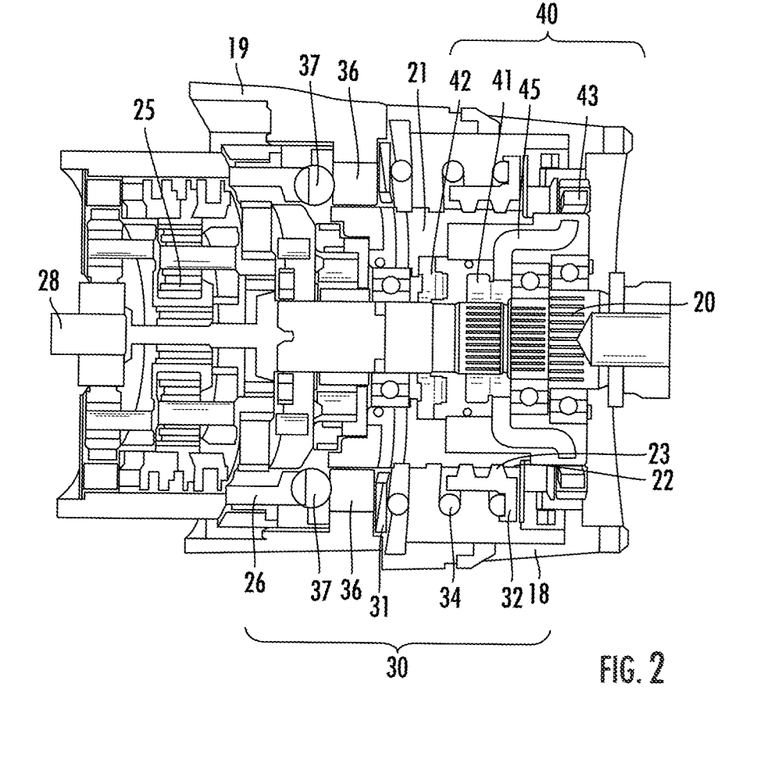
FIG. 2 is a cross-sectional view of the power tool of FIG. 1, including the transmission, clutch mechanism and hammer mechanism.
Figure 3:
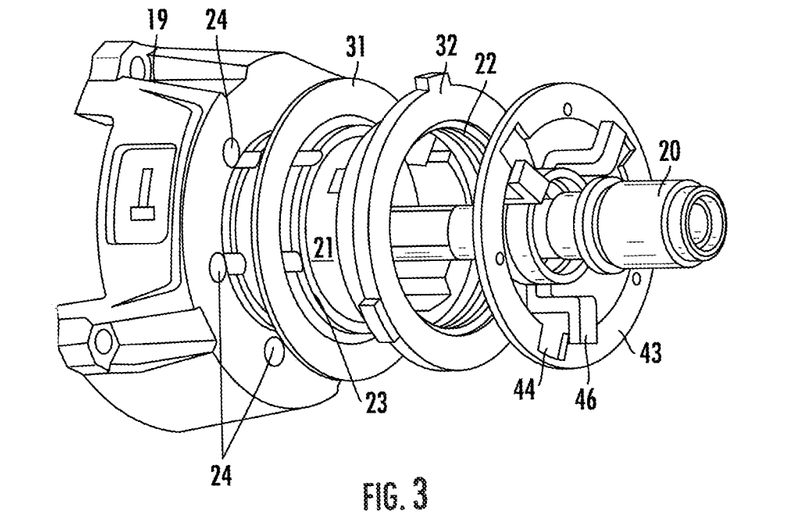
FIG. 3 is a perspective view of a portion of the power tool of FIG. 1, including the transmission housing, clutch mechanism, and hammer lockout mechanism.
Figure 4:
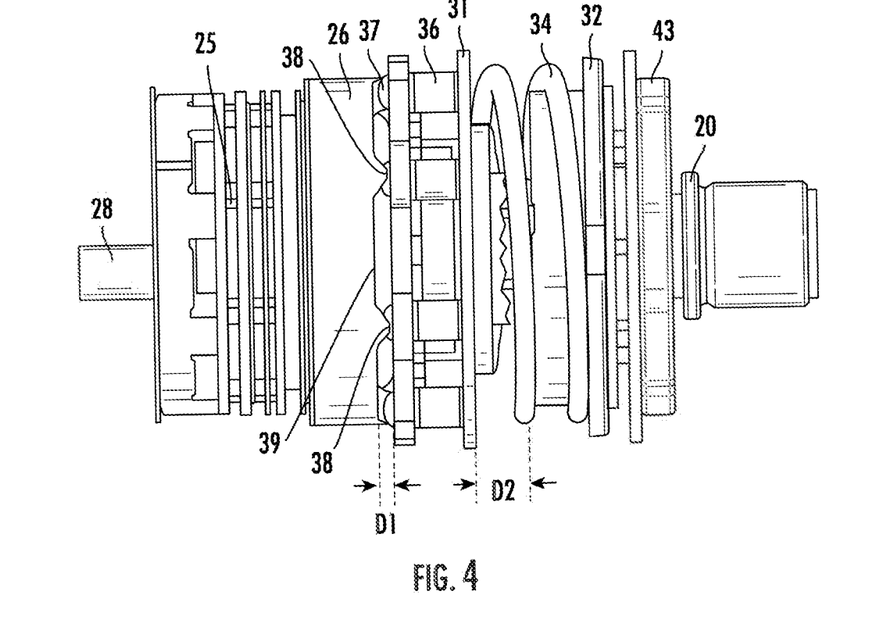
FIG. 4 is a side view of a portion of the power tool of FIG. 1, including the transmission and clutch mechanism in a first operation mode.

A multi-step clutch 30 provides a torque limited output to the spindle 20, or can be disabled/locked-out to provide a non-torque limited output. As shown in FIGS. 2 to 4, the multi-step clutch 30 includes a clutch washer 31 and a sleeve 32 that is axially and rotatably adjustable in response to user rotation of the clutch/mode selection collar 18. The clutch sleeve 32 has a bore having an inner perimeter that includes threads 23 that cooperate with external threads 22 on the external perimeter of gear housing extension portion 21. Clutch sleeve 32 is additionally rotationally fixed with mode selection collar 18. The clutch/mode selection collar 18 is rotatably adjustable by the user of the multi-function tool to select a particular clutch, or torque, setting of the handheld tool, and to shift the tool between screwdriver, drill-only, and hammer drill modes of operation. As the collar 18 is rotated it rotates clutch sleeve 32 causing clutch sleeve 32 to axially progress along gear housing extension portion 21 by interaction of threads 23/22. A coil clutch spring 34 is arranged between the clutch washer 31 and the clutch sleeve 32, such that the clutch washer 31 is biased rearwardly towards the gear transmission 25 (to the left as viewed in FIG. 2) away from the clutch sleeve 32.

The clutch 30 has a plurality of clutch or torque settings in "screwdriver mode", ranging from a first position of clutch sleeve 32 most axially distant from clutch washer 31 to a second position of clutch sleeve 32 axially proximate clutch washer 31. In the first most axially distant position the clutch spring 34 is in its least compressed or preloaded state, and in the second most axially proximate position the clutch spring 34 is in its most compressed or preloaded stated. Rotating the clutch sleeve 32 via the clutch/mode selection collar 18 adjusts the preload of the clutch spring 34 force on the clutch washer 31, such that the torque limit is adjusted, as described in further detail below. When the clutch sleeve 32 is most proximate to the clutch washer 31 applying maximum preload to the spring 34 the tool is in its drill mode.

The clutch 30 also includes a plurality of followers such cylindrical pins 36 and balls 37. The plurality of cylindrical pins 36 are received within a respective plurality of circumferentially spaced axial bores 24 in the transmission housing 19. A clutch face 38/39 is defined on a last stage outer ring gear 26 of a transmission 25. The plurality of balls 37 are positioned between the respective pins 36 and the clutch face 38/39. The outer ring gear 26 is positioned in the transmission housing 19 of the hammer drill and is part of the third planetary stage of the transmission 25. The clutch face 38/39 includes a plurality of ramps 38 over which the balls 37 ride when the clutch 30 is engaged. The ramps 38 extend an axial distance D1 from a linear face portion 39 of the clutch face 38/39, such that the balls 37 must be able to axially translate at least the axial distance D1 away from linear face portion 39 in order to ride over the ramps 38 and thereby clutch the multi-function tool 10. Thus, in order for the clutch to operate the axial distance D2 between the clutch sleeve 32 and the clutch washer 31 must be greater than the of the distance D1 between the ramps 38 and linear face portion 39 of the clutch face. This allows the clutch washer 31 to translate towards the clutch sleeve 32 as the balls 37 ride over the ramps 38.

In operation of "screwdriver mode" shown in FIG. 4 when D2 is greater than D1 torque is transferred from the motor shaft 28 through the transmission 25 and to the spindle 20, during which time the outer ring gear 26 of the transmission 25 remains stationary with respect to the transmission housing 19 due to the pre-load exerted on the clutch face 38/39 by the clutch spring 34, the clutch washer 31, the pins 36 and the balls 37. Upon continued tightening of, for example, a fastener to a particular torque, a corresponding reaction torque is imparted to the spindle 20, causing the rotational speed of the spindle 20 to decrease. When the reaction torque exceeds the torque limit set by the mode selection/clutch collar 18 and clutch sleeve 32, the motor torque is transferred to the outer ring gear 26, causing it to rotate with respect to the transmission housing 19, thereby engaging the clutch 30 to clutch the tool by diverting the motor torque from the spindle 20. As a result, and because the distance D2 is greater than first axial distance D1, the balls 37 are permitted to axially translate far enough away from linear portion 39 of the clutch face that the balls 37 are allowed to ride up and down the ramps 38 causing the clutch washer 31 to reciprocate along the transmission housing 19 against the bias of the spring 34 between the clutch sleeve 32 and the clutch washer 31. The operation torque of the clutch is set by rotating the clutch/mode collar 18 to axially move clutch sleeve 32 between the first position of the clutch sleeve 32 most axially distant from clutch washer 31, as illustrated in FIG. 4, to the second position of the clutch sleeve 32 axially proximate clutch washer 31, where distance D2 is larger than distance D1. The more proximate the clutch sleeve 32 is to the clutch washer 31 the greater the clutch spring 34 preload and accordingly the higher the clutch operating torque.

Figure 5:
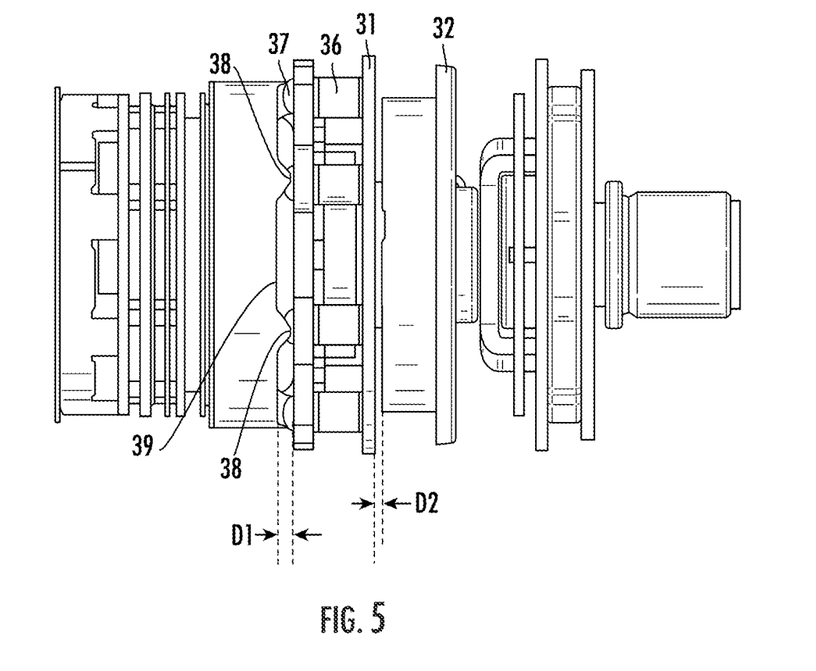
FIG. 5 is a side view of a portion of the power tool of FIG. 1, including the transmission and clutch mechanism in another operation mode.

In operation of "drill only" shown in FIG. 5 the clutch sleeve 32 is further adjusted to be just adjacent to but not engaging the clutch washer 31 such that distance D2 is less than D1. The balls 37 are prevented from riding over ramps 38 and the clutch 30 is locked-out. The motor can output torque at a maximum value to the spindle 20. Note that in FIG. 5 the spring 34 is omitted for clarity, but will be under high preload.

Figure 6:
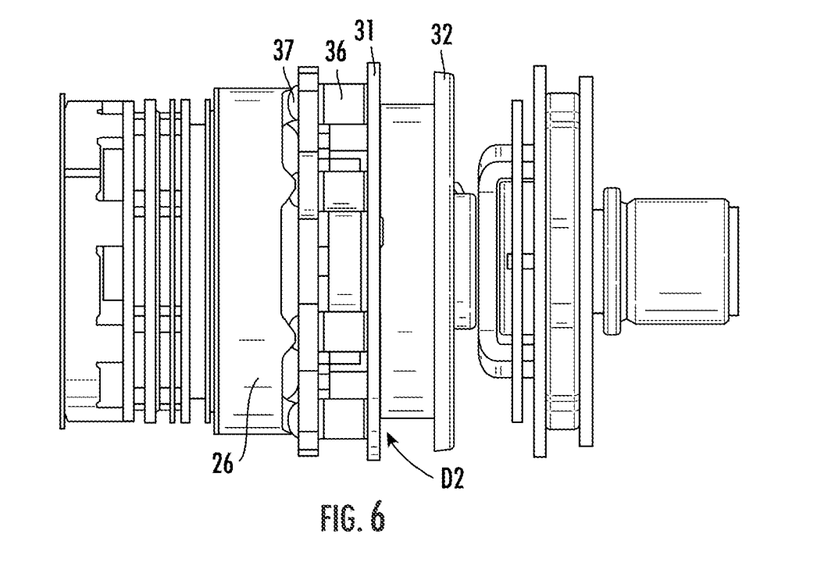
FIG. 6 is a side view of a portion of the power tool of FIG. 1, including the transmission and clutch mechanism in another operation mode.

In operation of "hammer drill" mode shown in FIG. 5 the clutch sleeve 32 is further adjusted to be engaging the clutch washer 31 and distance D2 is zero such that there is no gap between the clutch sleeve 32 and the clutch washer 31, the balls 37 are prevented from riding over ramps 38, which have an axial length of D1. Thus, in "hammer drill" mode, the clutch 30 is locked out and the motor is permitted to output torque at a maximum value to the spindle 20. Note that in FIG. 6 the spring 34 is omitted for clarity, but will be under high preload. In hammer mode the spindle is also permitted to reciprocate axially in a hammer action. This is described further below with reference to FIGS. 2 and 7 to 9.

Figure 7:
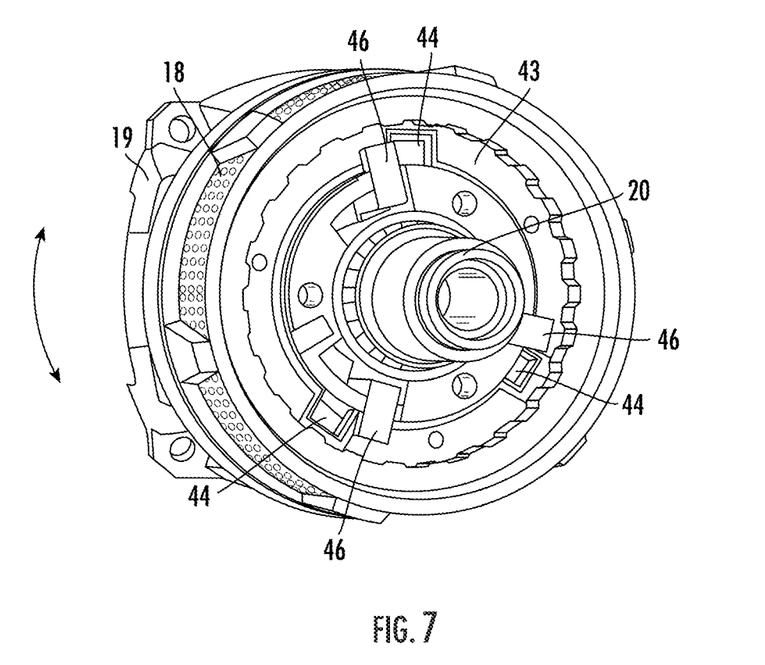
FIG. 7 is a perspective view of a portion of the power tool of FIG. 1, including the hammer lockout mechanism in an enabled position.
Figure 8:
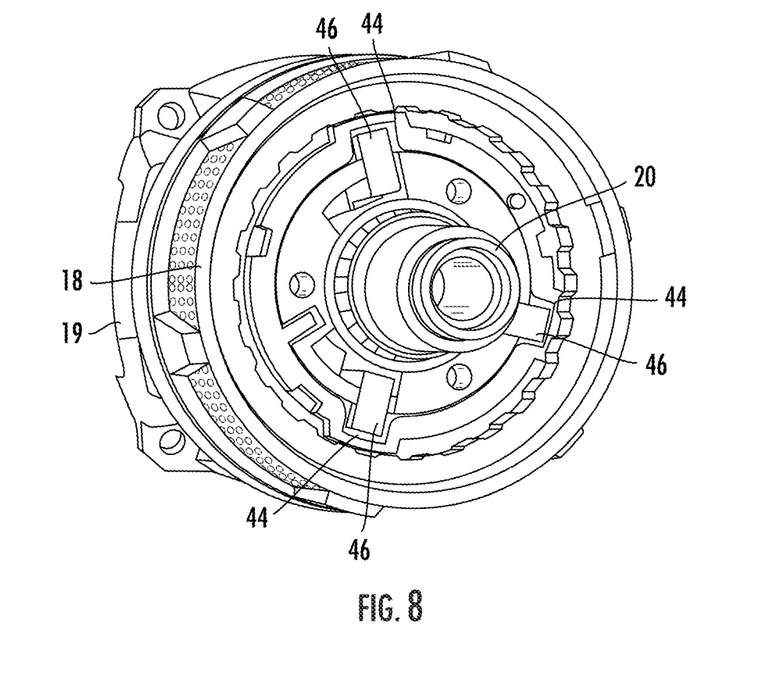
FIG. 8 is a perspective view of a portion of the power tool of FIG. 1, including the hammer lockout mechanism in a disabled position.
Figure 9:
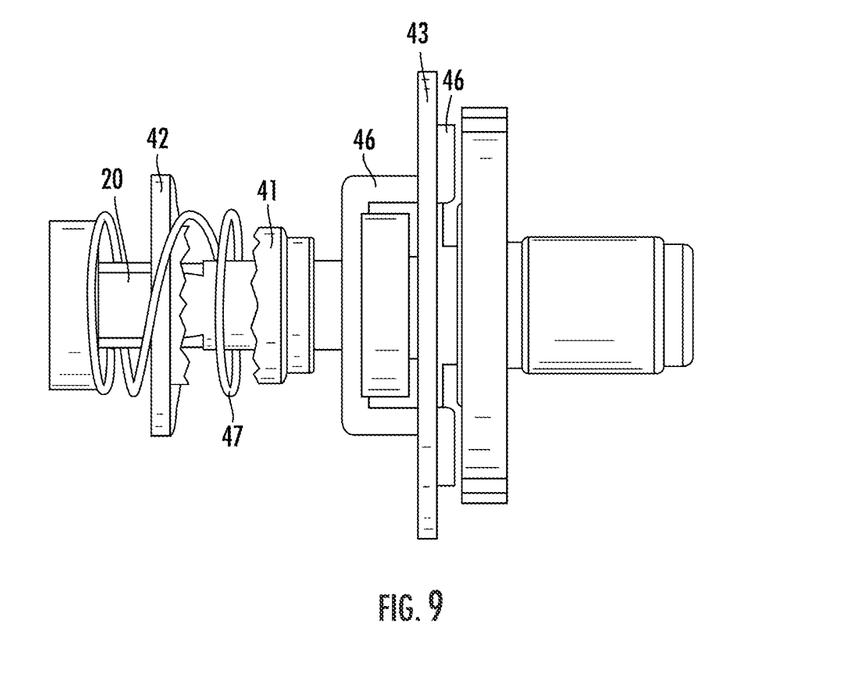
FIG. 9 is a side view of a portion of the power tool of FIG. 1, including the hammer mechanism and the hammer lockout mechanism.

FIGS. 7 to 9 of the attached drawings illustrates a hammer mechanism 40 (FIG. 2) of the multi-function tool 10. The hammer mechanism 40 includes a first ratchet 41 coupled for co-rotation with the spindle 20, a second ratchet 42 rotationally and axially fixed to a transmission housing 19 of the hammer drill and a hammer lockout mechanism 43, 44, 45, 46 for selectively inhibiting the ratchets 41, 42 from engaging when the multi-function tool 10 is in a "screwdriver mode" or a "drill-only mode", which would otherwise impart axial reciprocation to the spindle 20. The hammer lockout mechanism includes a ring 43 coupled for co-rotation with and positioned inside the clutch/mode collar 18. The ring 43 has a plurality of radially-outward extending recesses 44. The hammer lockout mechanism also includes a plurality of asymmetrically arranged axial arms 45 each with a radially-outward extending tab 46. The arms extend from a hub coupled for axial, but not rotational, movement with the spindle 20.

As shown in FIG. 7 when the mode collar 18 and ring 43 are rotated to corresponding positions for either "screwdriver mode" or "drill-only mode," the tabs 46 of arms 45 are misaligned with the recesses 44. In response to the spindle 20 being depressed against a workpiece, the tabs 46 abut against the ring 43, and interfere with rearward sliding movement of the spindle 20, inhibiting contact between the ratchets 41, 42 thereby enabling the hammer lockout mechanism, and inhibiting reciprocation of the spindle 20. However, as shown in FIG. 8, when the mode collar 18 and ring 43 are rotated to a corresponding position for a "hammer drill mode," the tabs 46 are aligned with the recesses 44 in the ring 43, permitting the tabs 46 to pass through the recesses 44 during rearward sliding movement of the spindle 20. This allows the ratchets 41, 42 to contact each other to impart impacting reciprocation to the spindle 20 thereby disabling the hammer lockout mechanism.

Advantageously the use of a single mode setting collar that can be rotated to one of a plurality of positions to engage two or more torque clutch limited screwing modes, or non-torque limited dill or hammer drill modes provides a quick and easy mode setting means for a user. It also ensures that without thought the user can only select a single mode of operation, for example the user cannot enable a torque clutch limited mode while also in drill or hammer drill mode which might not be the case where the hammer and drill modes selector is separate from the torque clutch setting collar.

The invention claimed is:

1. A power tool comprising:
   a motor configured to provide a torque output;
   a transmission configured to receive the torque output from the motor, the transmission including a ring gear including a face having a plurality of ramps extending a fixed axial distance from a linear portion of the face;
   a spindle receiving a torque output from the transmission;
   a setting collar rotatable between a plurality of predetermined angular positions that includes a first predetermined angular position corresponding to a non-torque-limited first operation mode of the power tool and a plurality of second predetermined angular positions corresponding to different torque output settings of a torque-limited second operation mode of the power tool; and
   a clutch coupled to the transmission including
      a clutch washer,
      a follower positioned between the face and the clutch washer, and
      a clutch sleeve coupled to the setting collar, the clutch sleeve movable a variable axial distance from the clutch washer dependent on a respective one of the plurality of predetermined angular positions of the setting collar,
      wherein in the first predetermined angular position of the setting collar that corresponds to the non-torque-limited first operation mode of the power tool, the fixed axial distance is greater than the variable axial distance, and in the second predetermined angular positions of the setting collar the variable axial distance is greater than the fixed axial distance.

2. The power tool of claim 1, further comprising a clutch spring positioned between a portion of the clutch sleeve and the clutch washer.

3. The power tool of claim 1, wherein the follower includes a ball and pin.

4. The power tool of claim 1, wherein the clutch sleeve is rotationally fixed with the setting collar for rotation with the setting collar.

5. The power tool of claim 1, further comprising a motor housing at least partially enclosing the motor and a transmission housing coupled to the motor housing and at least partially enclosing the transmission and the clutch.

6. The power tool of claim 5, wherein the follower extends through a bore in the transmission housing.

7. The power tool of claim 5, wherein the transmission housing includes an extension portion extending away from the motor housing and the clutch sleeve is disposed about and axially movable along the extension portion.

8. The power tool of claim 7, wherein the transmission housing includes a first portion, the extension portion is a second portion, and the clutch washer is positioned adjacent a transition between the first portion and the second portion of the transmission housing.

9. The power tool of claim 5, further comprising
a first ratchet and a second ratchet at least partially located within the transmission housing and arranged to selectively impart axial impacts to the spindle,
a lockout mechanism, a portion of which is rotatable with the setting collar, the lockout mechanism having an enabled position corresponding to the second predetermined angular positions of the setting collar that correspond to different torque output settings of the second operation mode of the power tool, and a disabled position corresponding to the first predetermined angular position of the setting collar that correspond to the first operation mode of the power tool,
wherein in the enabled position, axial impacts to the spindle are inhibited, and in the disabled position, axial impacts to the spindle are enabled.

10. The power tool of claim 9, wherein the lockout mechanism comprises a ring coupled for co-rotation with the setting collar and having a radially-outward-extending recess, and an axial arm coupled for axial, but not rotational, movement with the spindle and having a radially-outward-extending tab, wherein in the disabled position the radially-outward-extending recess and radially-outward-extending tab are rotationally aligned such that the radially-outward-extending tab is permitted to pass through the radially-outward-extending recess to allow axial movement of the axial arm and spindle.

11. A power tool comprising:
a motor configured to provide a torque output to a spindle through a transmission, the transmission including a ring gear including a face having a ramp extending a fixed axial distance from a linear portion of the face;
a setting collar rotatable between a plurality of predetermined angular positions that includes a first predetermined angular position corresponding to a non-torque-limited first operation mode of the power tool and a plurality of second predetermined angular positions corresponding to different torque output settings of a torque-limited second operation mode of the power tool; and
a clutch coupled to the transmission including
a clutch washer,
a follower positioned between the face and the clutch washer,
a clutch sleeve coupled to the setting collar, the clutch sleeve movable a variable axial distance from the clutch washer dependent on a respective one of the plurality of predetermined angular positions of the setting collar, and
wherein in the first predetermined angular position of the setting collar that corresponds to the non-torque-limited first operation mode of the power tool, the fixed axial distance is greater than the variable axial distance, and in the second predetermined angular positions of the setting collar the variable axial distance is greater than the fixed axial distance.

12. The power tool of claim 11, wherein at least a third one of the predetermined angular positions of the setting collar corresponds to a non-torque limited third operation mode of the power tool, wherein in the third one of the predetermined angular positions the fixed axial distance is greater than the variable axial distance.

13. The power tool of claim 12, wherein in at least one of the first predetermined angular position or the third predetermined angular position of the setting collar corresponding to the first operation mode or the third operation mode of the power tool, a portion of the clutch sleeve engages with a portion of the clutch washer.

14. The power tool of claim 13, further comprising a lockout mechanism, a portion of which is rotatable with the setting collar, the lockout mechanism having an engaged position corresponding to the second predetermined angular positions of the setting collar that correspond to different torque output settings of the second operation mode of the power tool, and a disengaged position corresponding to the first predetermined angular position of the setting collar that corresponds to the first operation mode of the power tool, wherein in the engaged position, axial impacts to the spindle are inhibited and in the disengaged position axial impacts to the spindle are enabled.

15. A power tool comprising:
a motor configured to provide a torque output;
a transmission configured to receive the torque output from the motor, the transmission including a ring gear including a face having a plurality of ramps extending a fixed axial distance from a linear portion of the face;
a spindle receiving a torque output from the transmission;
a setting collar rotatable between a plurality of predetermined angular positions that includes a first predetermined angular position corresponding to a first operation mode of the power tool and a second predetermined angular position corresponding to a second operation mode of the power tool; and
a clutch coupled to the transmission including
a clutch washer,
a follower positioned between the face and the clutch washer, and
a clutch sleeve coupled to the setting collar, the clutch sleeve movable a variable axial distance from the clutch washer dependent on a respective one of the plurality of predetermined angular positions of the setting collar,
wherein in the first predetermined angular position of the setting collar that corresponds to the first operation mode of the power tool, the fixed axial distance is greater than the variable axial distance, and in the second predetermined angular position of the setting collar the variable axial distance is greater than the fixed axial distance.

16. The power tool of claim 14, wherein the first operation mode is a non-torque-limited operation mode.

17. The power tool of claim 14, wherein the second operation mode is a torque-limited operation mode.

18. The power tool of claim 14, wherein the second predetermined angular position is one of a plurality of predetermined angular positions corresponding to the second operation mode.

19. The power tool of claim 14, wherein at least a third one of the predetermined angular positions of the setting collar corresponds to a non-torque limited third operation mode of the power tool, wherein in the third one of the predetermined angular positions the fixed axial distance is greater than the variable axial distance.

20. The power tool of claim 19, wherein in at least one of the first predetermined angular position or the third predetermined angular position of the setting collar corresponding to the first operation mode or the third operation mode of the power tool, a portion of the clutch sleeve engages with a portion of the clutch washer.

* * * * *